United States Patent [19]
Cutler, Jr.

[11] 3,962,711
[45] June 8, 1976

[54] ACCESSORY ADAPTER FOR PHOTOGRAPHIC APPARATUS

[75] Inventor: Norman W. Cutler, Jr., Braintree, Mass.

[73] Assignee: Polaroid Corporation, Cambridge, Mass.

[22] Filed: Dec. 16, 1974

[21] Appl. No.: 533,327

[52] U.S. Cl................................ 354/295; 354/286
[51] Int. Cl.² ........................................ G03B 17/56
[58] Field of Search ................ 354/295, 80, 81, 82, 354/126, 187, 189, 286, 287, 293, 354; 224/50; 240/81 C, 81 E

[56] References Cited
UNITED STATES PATENTS

| | | | |
|---|---|---|---|
| 1,053,400 | 2/1913 | Johnson | 354/81 |
| 1,318,148 | 10/1919 | Herwig, Jr. | 240/81 BE |
| 3,291,179 | 12/1966 | Lang | 354/293 X |
| 3,759,153 | 9/1973 | Aimo et al. | 354/295 X |
| 3,820,135 | 6/1974 | Dickson | 354/81 |
| 3,821,771 | 6/1974 | Johnson et al. | 354/293 |

Primary Examiner—L. T. Hix
Assistant Examiner—E. M. O'Connor
Attorney, Agent, or Firm—John W. Ericson

[57] ABSTRACT

An accessory attachment for use with a camera of the type having a frontal housing for an objective lens, a shutter mechanism, and camera function-controlling devices such as photocells and shutter or control knobs or buttons. The housing also has a socket for mounting and connecting a flash lamp. The accessory attachment serves to mount accessories such as auxiliary portrait, wide-angle, or telephoto lenses, filter lenses for the camera's objective lens and photocell, auxiliary shutter or control knobs, and flash equipment, in aligned operative relation to the corresponding elements of the camera. The attachment comprises a housing for the accessory device, a mounting element having a plug receivable in the flash-lamp socket of the camera, and a clip engageable with a surface of the lens-shutter housing such as the lens bezel. The accessory housing may be pivotally connected to the mounting element to permit convenient access to the camera, as for inserting film cartridges; and a releasable latch is provided to hold the accessory housing in place with respect to the mounting element.

1 Claim, 4 Drawing Figures

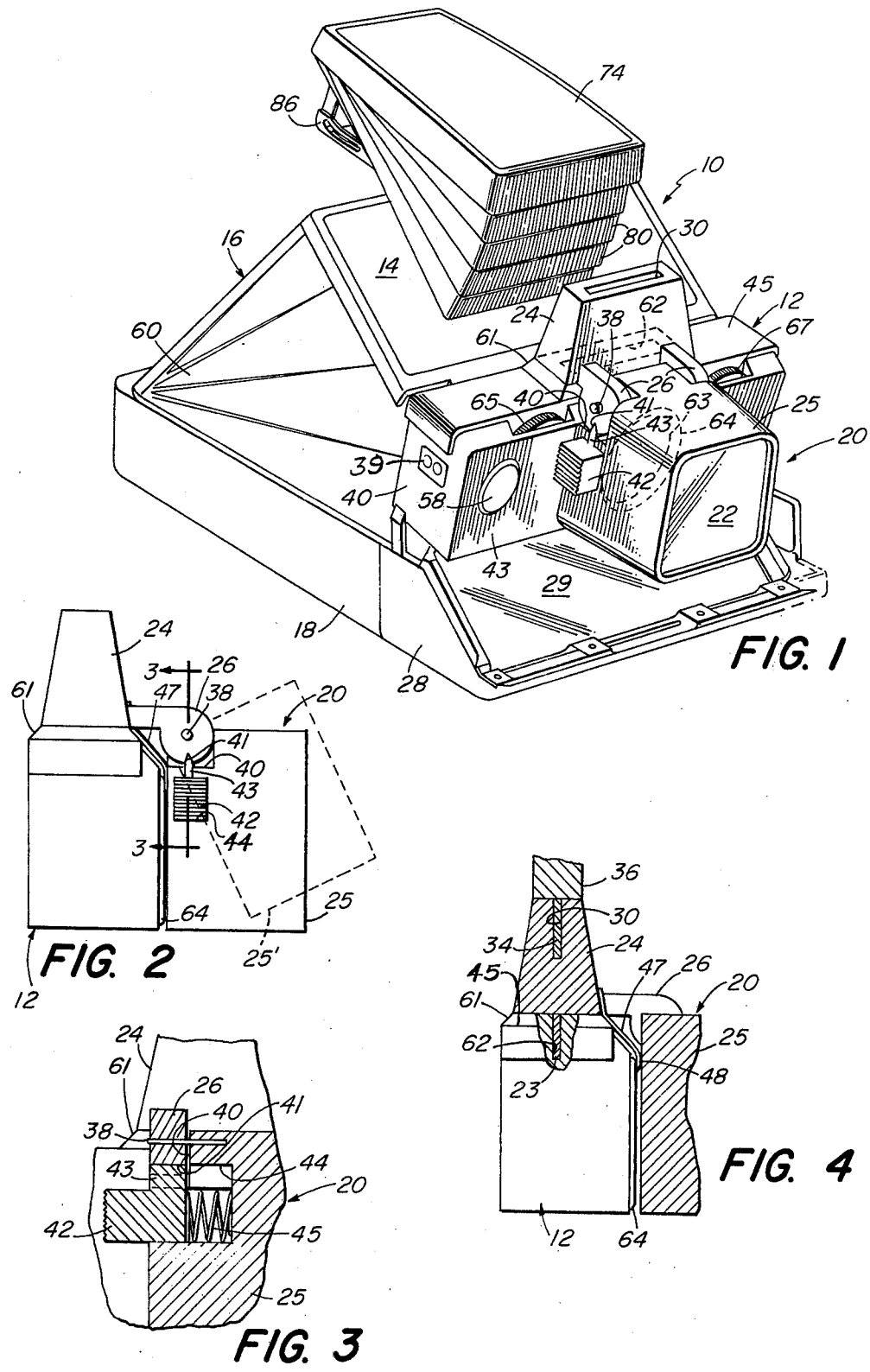

ACCESSORY ADAPTER FOR PHOTOGRAPHIC APPARATUS

BACKGROUND AND BRIEF DESCRIPTION OF THE INVENTION

This invention relates to means for conveniently attaching accessories to cameras, and has special application to cameras of the kind having a frontal housing for mounting such elements as an objective lens, a shutter mechanism, a photographic process-controlling photocell, flash equipment, or related devices.

Cameras of a type in connection with which this invention will be particularly described are disclosed and claimed, inter alia, by U.S. Pat. Nos. 3,714,879 and 3,810,211, which are assigned to the assignee of this application. These patents pertain to compact collapsible cameras of the self-developing type, now well known in the art and in common use, and it is sufficient for purposes of describing the present invention to explain that their lens-shutter housings have a front wall in which an objective lens and camera function-controlling devices are mounted, and a top wall which extends rearwardly. A socket for mounting and connecting flash lamps is located in this top wall.

It is often desired to employ various camera accessories for special photographic purposes. These accessories include flash and strobe-light equipment; special lenses for close-ups, telephoto, or wide-angle photography; filters for haze or for special effects; and remote-control and time-delay equipment. It is of great convenience to the photographer to be able to attach and detach such auxiliaries quickly, and with a minimum of manipulation. Further, the accessories should be as compact as possible, so as not to overburden the photographer. These requirements acquire even more pronounced importance in relation to cameras which are intended to be specially compact so that they can be carried in pocket or purse, rather than in bulky and cumbersome shoulder cases.

But the very compactness of such cameras poses obstacles to the convenience of attaching accessories, and of making necessary electrical and mechanical connections. The necessarily small lens-shutter housing is already rather crowded by the elements which must be mounted on it, and which must have open access; these include the objective lens, a photocell and manual knobs for controlling the camera settings, an actuator or shutter button, and sockets for flash or strobe lights and for remote-control or time-delay cables. The difficulty is therefore to mount and connect any desired accessories without obscuring or blocking any of the elements of the camera proper.

The general object of the present invention is to afford photographers convenient, easily and quickly mountable and demountable means for attaching accessories in operative relation to cameras. Further objects and advantages of the invention will become apparent as the following description proceeds.

BRIEF DESCRIPTION OF THE DRAWING

While the specification concludes with claims pointing out the subject matter which is regarded as the invention, it is believed that a clearer understanding may be gained from the following description of a preferred embodiment, referring to the accompanying drawing, in which:

FIG. 1 is a pictorial view showing the improved accessory attachment mounted on an illustrative camera;

FIG. 2 is a view in side elevation of the attachment and a lens-shutter housing of the camera;

FIG. 3 is a fragmentary, sectional view taken along line 3—3 in FIG. 2, looking in the direction of the arrows; and FIG. 4 is a fragmentary partially-sectional view in side elevation of the attachment and the lens-shutter housing.

DESCRIPTION OF THE PREFERRED EMBODIMENT

Referring to the drawing, a camera is generally indicated at 10, which is of a general type suitable for use with the improved accessory attachment. The illustrated camera is collapsible, as described more fully in the aforementioned U.S. Pat. Nos. 3,714,789 and 3,810,211, but is shown in its extended operative condition. It includes a series of housing members 14, 16, 18 and a lens-shutter housing 12, which are pivotally connected to form a collapsible four-bar linkage so that the camera may be folded into a flat, compact form. An additional housing member 28 is hinged to the housing member 18, and normally latched in the position shown. When unlatched, the housing member 28 can be swung down to open an entry slot for insertion of a film magazine (not shown) into the camera; this slot is normally closed by a pivoted, resiliently biased light-shielding plate member 29 carried on the housing member 28. A light-tight enclosure for receiving the film magazine is defined by the aforementioned housing members and by a collapsible bellows 60. The housing member 14 supports a collapsible viewing device 74 which includes telescoping blades 80, and a linkage 86 to erect a mirror and lens system (not shown) when the camera is opened, to allow reflex viewing through an objective lens 63 of any scene to be photographed.

The lens-shutter housing 12 is generally parallelepiped in form, having a front wall 43, rearwardly-extending side walls 40, and a top wall 45. The top wall is provided with a flash unit support pedestal 61, in which a socket 62 is formed to receive a connecting plug of a flash unit (not shown) of a type fully described by U.S. Pat. No. 3,759,153, assigned to the assignee of this application. One of the side walls 40 is formed with sockets 39 for the connection of a suitable cable (not shown) for remote-control operation of the camera.

The housing 12 encloses a suitable shutter mechanism (not shown). An objective lens 63 is centrally mounted in the front wall 43, and surrounded by a bezel 64. To its left may be located a transparent lens (not shown) for admitting incident light from any scene viewed by the objective lens to a photocell (not shown) for controlling the photographic functions of the camera in a known manner. A camera cycle start button 44, commonly referred to as a shutter button, is set to the right of the objective lens. The upper edge of the front wall is formed with recesses to accommodate a manual lens-focusing knob 65, and a manual light/dark control knob 67 which adjusts the relationship between the camera settings and the controlling photocell responses in a known fashion.

It will be apparent that the crowded condition of a compact lens-shutter housing resulting from the necessary presence of all these elements, combined with the requirement not to obscure or render any of them inaccessible, poses a material obstacle to convenient attachment of camera accessories such as auxiliary lenses, flash equipment, and the like.

According to the present invention, an accessory attachment 20 includes a housing 25 for the accessory, which is illustrated as an auxiliary lens 22 to be supported in front of, and in alignment with, the focal axis of the camera's objective lens 63. The attachment also incorporates a mounting element 24, to the bottom of which is secured a connecting plug member 23 that is slidably engageable in the socket 62 otherwise usable to attach and electrically connect a flash-lamp unit 36 to the camera. To provide for connecting the same flash unit when the accessory attachment is mounted, an auxiliary socket 30 is formed in the top of the element 24, of the same dimensions and having the same arrangements of electrical contact strips (not shown) as the socket 62. The connecting plug 34 of the flash unit 36 is receivable in the socket 30, and appropriate electrical connections (not shown) are made within the element 24 to its plug 23 to connect the flash unit properly with the camera. Appropriate electrical arrangements are more fully explained by the aforementioned U.S. Pat. No. 3,759,153, and need not be further elaborated for purposes of describing the present invention.

The mounting element 24 is secured to the camera's lens-shutter housing 12 by inserting the plug 23 into the socket 62 and pressing the mounting element 24 downwardly. To provide additional security against accidental separation, a spring clip 47 is preferably secured to the mounting element and extends forwardly and downwardly therefrom to terminate in a hook portion 48, which slides downwardly as the plug 23 is inserted, and clips under the lens bezel 64 of the camera. Alternatively, the clip may engage under any surface of the camera which is opposed to its top wall 45 and socket 62, e.g., the bottom of the lens-shutter housing 12. When the accessory attachment is pulled upwardly to remove it from the camera, the hook portion 48 deflects outwardly from the lens bezel 64 and slidably disengages from the camera.

If desired, the accessory housing 25 may be fixedly secured to the mounting element 24. However, it is desirable and convenient to be able to gain access to the elements of the camera without having to remove the accessory attachment. For this purpose, and in accordance with another feature of the invention, the housing 25 is pivotally connected by means of pins 38 to cantilever arms 26 extending forwardly from the mounting element 24, so that the housing may be tilted upwardly and away from the front wall 43 of the camera, to positions such as illustrated in dotted lines at 25' in FIG. 2. This facilitates insertion and removal of film magazines through the slot opened by manipulation of the housing member 28 ad described above, and also affords ready access to the lens 63 or other elements of the camera. The housing 25 has recesses 40 formed to receive the protruding ends of the arms 26.

To secure the accessory housing 25 normally in operative angular relation to the camera, a releasable finger-operated latch member 42 is slidably received in a key-shaped recess 44 let into the side of the housing. The latch member bears a detent 43, which normally engages in a notch 41 formed in one of the arms 26 to hold the housing 25 in fixed angular relation to the mounting element 24. The latch member 42 is biased to the left as viewed in FIG. 3 by a compression spring 45 received in the recess 44. The spring may be cemented or bonded at its opposite ends to the latch member and to the base of the recess to prevent the latch member from escaping. To release the housing 25, the latch member 42 is depressed to disengage the detent 43 from the notch 41, and the housing is raised angularly to a tilted position such as shown at 25' in FIG. 2. Lowering the housing to the position shown in solid lines at 25 automatically allows the spring 45 to restore the engagement of the detent 43 in the notch 41, and latches the parts in place again. If so desired, a second notch similar to 41 could be located about ninety degrees counterclockwise from the notch 41 in the arm 26 to allow the housing to be latched up into a convenient position for loading film in the camera.

What is claimed is:

1. An accessory attachment for use with a camera having a front wall mounting a lens, and a top wall extending rearwardly from said front wall, said top wall being formed with a downwardly-extending socket, said accessory attachment comprising:

a camera accessory device, a housing mounting said accessory device therein, a mounting element having a lower surface receivable on said top wall, a plug attached to said lower surface and extending downwardly therefrom, said plug being slidably receivable in said socket to attach said mounting element to said camera, clip means attached to said mounting element and engageable with a downwardly-facing surface of said camera, a pair of cantilever arms attached to said mounting element and extending forwardly from said front wall of the camera in the attached position of said mounting element thereon, said housing being pivotally attached to said cantilever arms and normally suspended thereby in operative relation to said front wall of the camera, said housing being angularly movable about said pivotal attachment to positions raised from said front wall to permit access thereto, and releasable latch means for engaging said housing to said mounting element in said normally suspended operative relation.

* * * * *